United States Patent

Olsen et al.

[15] 3,679,819

[45] July 25, 1972

[54] VIDEO BLANKING AND SOUND MUTING CIRCUIT EMPLOYING GROUNDED TUNER SWITCHES

[72] Inventors: Perry Charles Olsen; Pak Chong Tang, both of Indianapolis, Ind.

[73] Assignee: RCA Corporation

[22] Filed: Feb. 3, 1971

[21] Appl. No.: 112,223

[52] U.S. Cl. ..........178/5.8 R, 178/7.3 R

[51] Int. Cl. ..........H04n 5/44

[58] Field of Search ..........178/5.8 R, 7.3 R

[56] References Cited

UNITED STATES PATENTS

| | | | |
|---|---|---|---|
| 2,602,855 | 7/1952 | Cunningham | 178/5.8 R |
| 3,011,017 | 11/1961 | Oeler et al. | 178/5.8 R |
| 3,018,326 | 1/1962 | Petrick et al. | 178/5.8 R |
| 3,096,397 | 7/1963 | Stachowiak et al. | 178/5.8 R |
| 3,131,255 | 4/1964 | Di Nardo | 178/5.8 R |

*Primary Examiner*—Robert L. Richardson
*Attorney*—Eugene M. Whitacre

[57] ABSTRACT

A switching circuit, dependent solely on the value of fixed impedances and supplied direct current voltages, blanks the picture and mutes the sound of a television receiver during its channel selection tuning, either manually or automatically by remote control. The circuit is a modification of that described in our concurrently filed application entitled "VIDEO BLANKING AND SOUND MUTING CIRCUIT" (Ser. No. 112,178), in its rearrangement of resistor components and utilization of a pair of grounded switches.

9 Claims, 10 Drawing Figures

INVENTORS
Perry C. Olsen &
Pak C. Tang
BY
ATTORNEY

INVENTORS
Perry C. Olsen &
BY Pak C. Tang
Charles [signature]
ATTORNEY

VIDEO BLANKING AND SOUND MUTING CIRCUIT EMPLOYING GROUNDED TUNER SWITCHES

BACKGROUND OF THE INVENTION

1. Field of the Invention

This invention relates to television receivers, in general, and to a circuit for blanking its picture and muting its sound during tuning from one desired channel to another, in particular.

2. Description of the Prior Art

Circuits of this general nature have been described in the prior art. Typical of such circuits are those disclosed in U.S. Pat. Nos. 3,011,017-Oeler, 3,096,397-Stachowiak and 3,131,255-DiNardo. Each of these patents point out the desirability of disabling either or both of the television picture and sound apparatus during channel selection. As is now well appreciated, such disabling serves to eliminate any unpleasant picture flickering or sound increase during the time interval between loss of one desired signal and retention of another.

As noted in our concurrently filed application entitled "-VIDEO BLANKING AND SOUND MUTING CIRCUIT" (112,178), the systems disclosed in these above-noted patents operate in an environment where power tuning is incorporated to switch between the program channels on the receiver. Each arrangement is described as including a motor cooperating with a television tuner to automatically change channels in response to a remote control order. Such operation of the energized motor causes various receiver connections to be interrupted—for example, to permit the cathode of the television kinescope to rise to a cutoff potential that will blank the picture tube image and to open circuit the energizing potentials applied to the sound system. Manual channel selection, on the other hand, was noted as preventing the energization of the motor to defeat the video blanking and sound muting features provided. Our concurrent application also describes how many receivers are not equipped for remote control operation, but incorporate such apparatus as automatic gain control systems which would respond to the loss of signal between channels to produce just that type of interference which it is the purpose of the energizing motor to eliminate when used in the remote control set.

SUMMARY OF THE INVENTION

As will become clear hereinafter, the invention of this application is also directed to a circuit which responds to rotations in the mechanical tuner of the receiver to effect the blanking and muting actions for all unprogrammed channels, independently of whether the rotation is afforded through manual or remote control means. In this respect, the invention is identical to that disclosed in our concurrently filed case. The invention is also identical in effecting the blanking and muting actions during channel selection. As will be seen from the described embodiment, however, a rearrangement of resistors are employed, for cooperation with a pair of grounded tuner switches, as contrasted with a single grounded tuner switch in the accompanying case, and with a more efficient switch positioning. Such rearrangement, however, continues to remain attractive due to its relative simplicity and universality of application in either manual or remote control receivers. Great reliability also continues due to the rearrangement's dependence on fixed resistor values and on supplied direct current voltages, and not on such previously used devices as transistors, whose operating characteristics have a tendency to substantially change with age and/or temperature.

BRIEF DESCRIPTION OF THE DRAWINGS

These and other advantages of the invention will be more readily apparent from the consideration of the following description taken in connection with the accompanying drawings in which.

DETAILED DESCRIPTION OF THE DRAWINGS

Figure 1A:
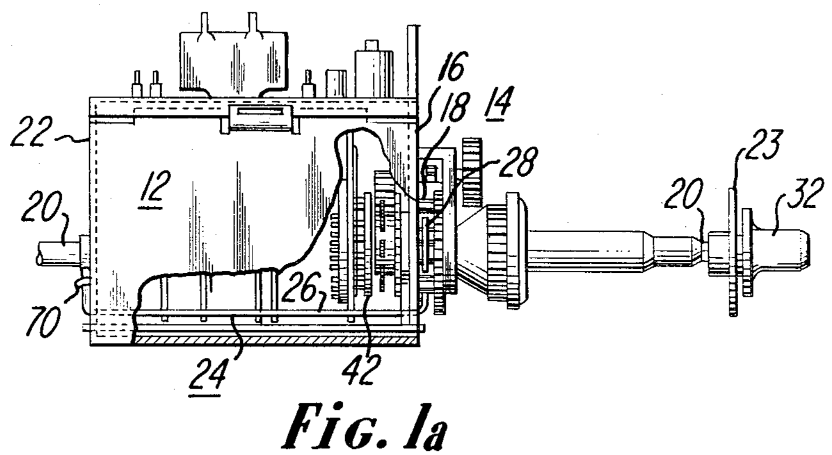
FIGS. 1*a*–1*d* schematically show portions of a television tuner having a switch arrangement useful in carrying out the video blanking and sound muting functions of the present invention.

A television tuner 12, in conjunction with which the video blanking and sound muting circuit of the invention is particularly applicable, may be of the detent type, having a gear assembly 14 mounted on its front plate 16. The gear assembly conventionally includes an index wheel 18 having a plurality of detents and positioned on a channel selecting shaft 20 which passes through the front plate 16 and a rear plate 22. A torSion spring detent 24, including an intermediate portion 26 extending parallel to the channel selector tuning shaft 20 and a right angle portion 28, engages the index wheel 18 to cause detent action during channel changes. Specifically, one end of the right angle portion 28 has a bend 30 which resiliently engages the detents of the index wheel 18.

Figure 1B:
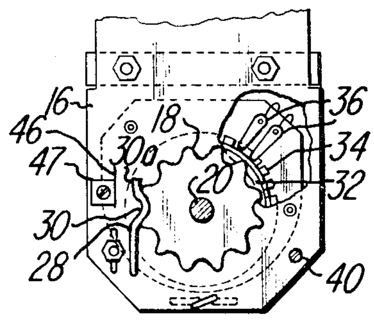

When the tuner channel selection knob 32 is rotated, the shaft 20 to which it is joined rotates, causing the index wheel 18 to rotate and cause a rearrangement of the electrical components within the tuner, to tune it to a desired channel. The torsion spring detent 24 during the rotational movement rides on the periphery of the index wheel 18, thereby effectuating a detent action to provide indexing of the channel selection shaft. Internal to the tuner are a series of rotary switches, best shown in FIG. 1*b*, which interconnect the electrical components of the tuner associated with each of the detent or channel positions. The rotary switches, only one of which is shown, include a rotor portion 32 which is secured for rotation with the channel selecting shaft 20. On the periphery of the rotor 32 are a series of rotor contacts 34 which are adapted to engage stator contacts 36 such that rotation of the rotor 32 to different detent positions bring different ones of the rotor contacts 34 into engagement with the stator contacts 36. Such tuner is generally of the step-by-step channel-tuning variety having detent-controlled channel selector stop positions over a full 360° rotation of the tuning shaft 20, for each of the 12VHF-band channels and for the UHF channel band. A movable manual control element or ring 23 is also fitted onto the tuning shaft 20 and connects with the interior operating mechanism of the tuning system for longitudinal movement toward and away from the front plate 16, in addition to rotation in either direction. In particular, rotation of the control 23 when moved toward the front plate 16, serves to provide fine tuning, preset tuning and programming adjustments of the system for the VHF band of signal frequencies.

Figure 1C:
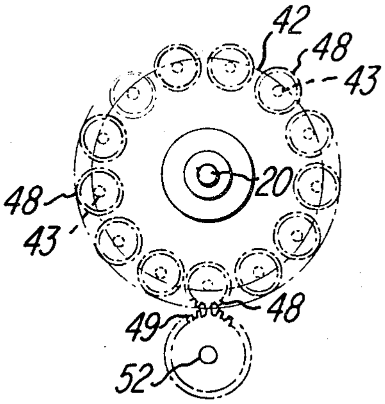
Figure 1D:
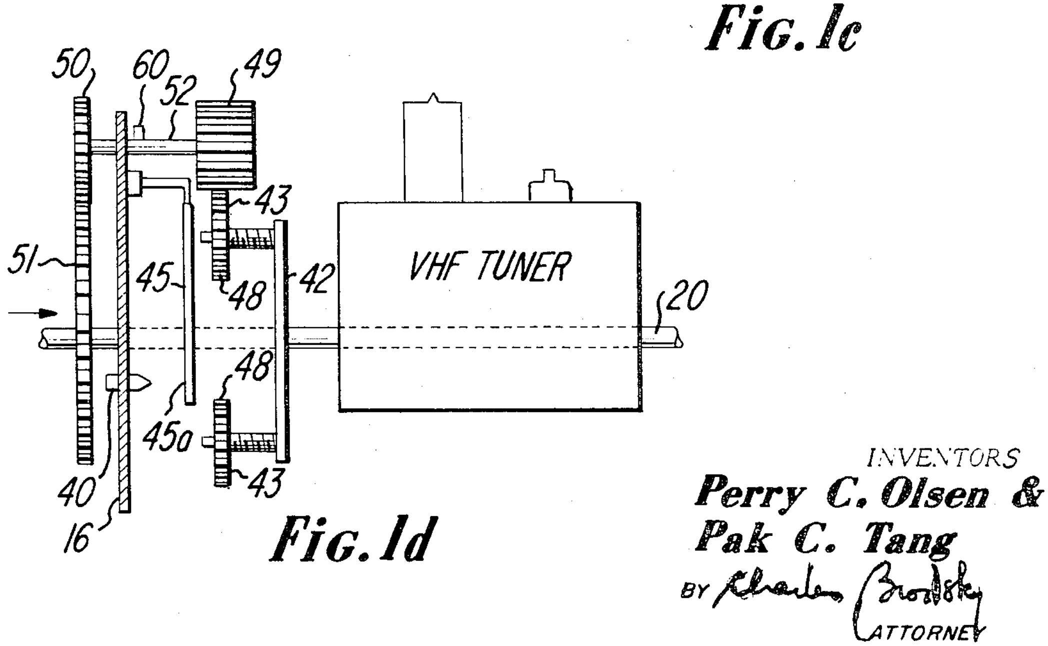

To accomplish such functions, the tuner is also provided with a 13-position turret 42 which is mounted on the tuning shaft 20 between the front plate 16 and back plate 22, as indicated in FIG. 1*c*. This turret carries 13 rotatable fine tuning or tuning adjustment screws 43, extending through the turret in a circular row near the periphery thereof and angularly spaced and in parallel relation to each other. As the turret 42 rotates with the tuning shaft 20 through the various tuning positions for Channel Nos. 2–13, the tips of 12 of the 13 tuning screws progressively come under one end of a fine tuning control lever 45 of the tuner (FIG. 1*d*) to move it to different positions for fine tuning such channels. The tip of the 13th tuning screw also comes under the control lever 45 for use in bypassing the UHF channel if desired, as when no such channel is operative in the viewer's geographical listening area. The heads 48 of the tuning screws 43 are pinion-gears which, when turned clockwise or counter-clockwise by a fine tuning gear 49, move the screws out or in with respect to the tuning lever. The opposite ends of the tuning screws cooperate as a fine-tuning plunger with internal fine tuning means (not shown), to thus adjust the fine tuning of the VHF channels at each stop position. As indicated, rotation of the fine tuning gear 49 is effected through corresponding movement of gears 50, 51 brought about by rotation of the tuning shaft 20 when moved toward the front plate 16 and by corresponding rotation of the connecting shaft 52.

In accordance with the teachings of the present invention, the fine tuning control lever 45 has a lip portion 45*a* positioned under a screw 40 which is electrically connected to the tuner front plate which is electrically grounded. The other end of the lever is electrically coupled to a terminal post 60, connected to the various components of the blanking and muting circuit, as described below. Pushing in on the control 23 and rotation of it in a counter-clockwise direction moves the pinion gear heads 48 towards physical contact with the tuning control lever 45 to move lip portion 45*a* to contact the grounded screw 40. The channel associated with such gear heads 48 is thus an undesired or unprogrammed channel and, as will be seen hereinafter, causes the television picture to blank and its sound to mute when tuning to such undesired channel. Rotation of the control 23 in the clockwise direction, however, moves the pinion gears away from the lever 45, to prevent the grounding of the fine tuning components of the tuner associated therewith in pre-programming desired channels. This lever arm-screw arrangement corresponds to the programming switch $S_P$ in the following description and, as described below, is electrically connected to fixed resistor components which play a part in blanking the picture and muting its sound during rotation of the selector knOb 32 and tuning shaft 20 to these unused channels.

In like manner, the tip 30*a* of the detent spring bend 30 which rides on the periphery of the index wheel 18 is shown as lying adjacent another lever arm 46 (FIG. 1*b*), for example, which is secured to the tuner 12 by a screw 47 which is electrically insulated from the grounded front plate 16. Such detent spring-lever arm arrangement corresponds to the intermediate channel switch $S_D$ in the following description. Contact between lever arm 46 and spring tip 30*a* is made in switching from one adjacent channel to another, and such contact serves to ground other fixed resistor components connected to arm 46. TunerS of this general type—but without the described lever arm arrangements for effecting the short circuiting to ground both for inter-channel switching and for undesired program channels—are more fully illustrated as the KRK 140 tuner in the Television Service Data Sheet, File 1970, No. T14, published by the RCA Sales Corporation.

Figure 2:
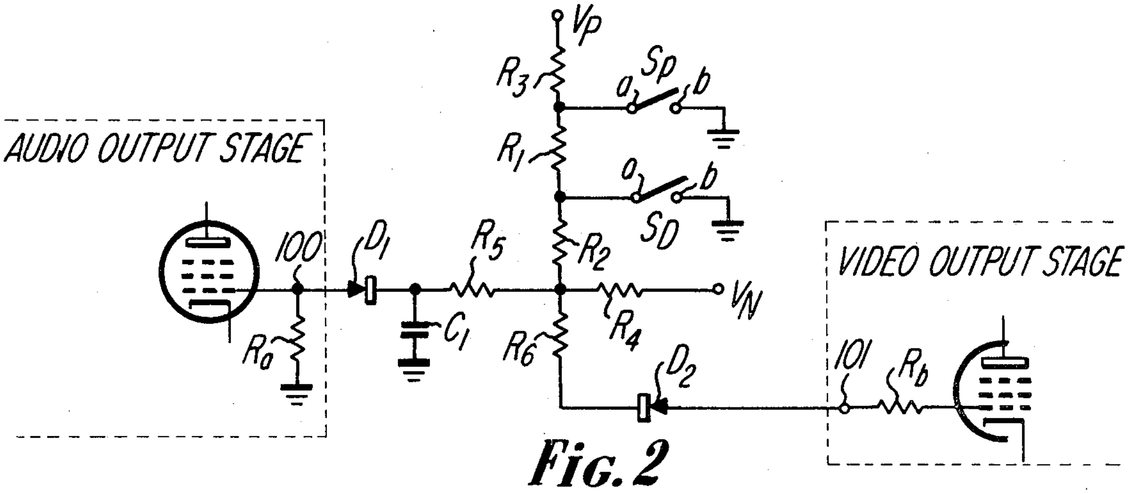
FIG. 2 illustrates a circuit for performing these functions according to the invention.

The configuration of FIG. 2 illustrates the schematic circuit according to the invention for blanking the television picture and muting its sound both between adjacent channels selected by the tuner and on unprogrammed channels—for example, those which do not transmit into the geographical area where the receiver is located. As indicated, those elements located outside of the dotted lines constitute components of the blanking and muting circuit, while those components within such dotted line constructions represent components of the video and audio output stages of the receiver, for example, which are controllable to eliminate the flickering of picture and rush of sound otherwise obtainable without such controlled operations. As shown, the circuit includes six resistors $R_1 - R_6$, a pair of semiconductor rectifiers $D_1 - D_2$, a capacitor $C_1$ and the programming and adjacent channel switches $S_P$ and $S_D$ described in connection with FIG. 1. That is, switch $S_P$ is located in the VHF tuner as a customer control by which any undesired channel may be bypassed through simple rotation of the fine tuning mechanism until either the sound mutes or the video blanks, or both. The switch $S_D$, on the other hand, is located for operation in conjunction with the detent of the tuner shaft 20.

Referring now to the drawings, it will be seen that resistors $R_1 - R_4$ are serially coupled between a pair of potential supplies $V_N$, $V_P$. Resistor $R_5$ couples the junction of resistors $R_2$, $R_4$ to the cathode of the rectifier $D_1$, the anode of which is coupled to a terminal 100 of the controlled audio output stage, illustratively shown as the control grid of the audio output tube. In like manner, resistor $R_6$ couples the junction of resistors $R_2$, $R_4$ to the cathode of the rectifier $D_2$, the anode of which is coupled to a terminal 101 of the video output stage—for example, to the control grid of the video output tube via a resistor $R_b$. One terminal *a* of the programming switch $S_P$ (e.g. terminal post 60 in FIG. 1*d*) is connected to the junction of resistors $R_1$, $R_3$ while a corresponding terminal *a* of the adjacent channel switch $S_D$ (e.g. lever arm 46 in FIG. 1*b*) is connected to the junction between resistors $R_1$, $R_2$. The other, or *b*, contact of the switches $S_P$, $S_D$ (screw 40 in FIG. 1*d*, the grounded detent spring tip 30*a* of FIG. 1*b* respectively,) are connected to ground. Lastly, the junction of resistor $R_5$ and rectifier $D_1$ is coupled to ground by the capacitor $C_1$, and a resistor $R_a$ is shown as providing grid bias to the audio output tube, coupled between the anode of rectifier $D_1$ and ground.

Figure 3:
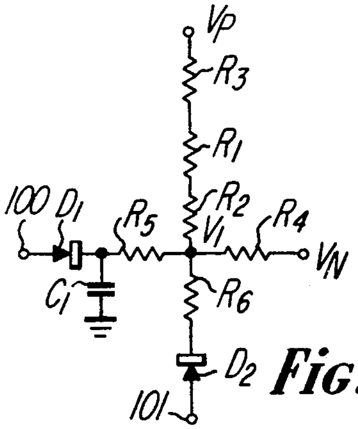
FIGS. 3–6 represent equivalent circuit diagrams for various conditions of the switch configuration of FIG. 2.

As with the arrangement in our concurrently filed application, it will be readily apparent that four possible configurations exist for the switch arrangement of FIG. 2. The first possibility exists when the switches $S_P$ and $S_D$ are both open, representing the normal operation of the receiver when tuned to a desired channel. The configuration of FIG. 2 then reduces to that represented by the equivalent arrangement of FIG. 3, with respect to which it can be shown that the direct voltage developed at the junction of resistors $R_2$, $R_4$ is given by the expression:

$$V_1 = \frac{R_4}{R_1 + R_2 + R_3 + R_4} V_P + \frac{R_1 + R_2 + R_3}{R_1 + R_2 + R_3\ R_4} V_N \qquad (1)$$

Where:

$V_1$ = the direct voltage developed at the junction of resistors $R_2$, $R_4$;

$V_P$ = the direct potential of the supply $V_P(+)$;

$V_N$ = the direct potential of the supply $V_N(-)$ and;

$R_1$, $R_2$, $R_3$ and $R_4$ = the resistance values of resistors $R_1 - R_4$, respectively. It will be readily apparent that by selection of resistor and supply potential values, the voltage developed at the junction of resistors $R_2$, $R_4$ can be predetermined. Since on-channel operation of the receiver requires the audio and video output stages to be in their normal conditions of operation, the voltage $V_1$ in one embodiment of the invention was selected to be approximately +14 volts, at which the rectifiers $D_1$ and $D_2$ will reverse bias. It will be seen that such operation eliminates any undesirable loading effects on either the audio or video output stages, thus making the receiver independent of this circuit in normal operation. Capacitor $C_1$, in this respect, serves to smooth any voltage ripple from the $V_N$ and $V_P$ supplies coupled to the cathode of rectifier $D_1$.

Figure 4:
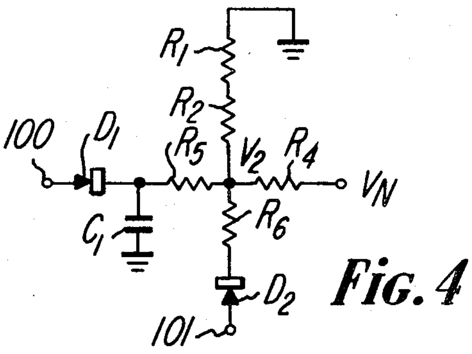

A second possibility for the switch configuration is illustrated in FIG. 4 as one in which the programming switch $S_P$ is closed but the intermediate channel switch $S_D$ is opened. Such occurrence exists when the channel selector of the tuner is rotated to an undesired channel. Neglecting the loading effects of resistors $R_5$ and $R_6$—which can be made large—, it can be shown that the direct voltage now developed at the junction of resistors $R_2$, $R_4$ is given by the expression:

$$V_2 = \frac{R_1 + R_2}{R_1 + R_2 + R_4} V_N \qquad (2)$$

Where:

$V_2$ = the voltage developed at the afore-noted junction; and

Where:

$R_1$, $R_2$, $R_4$ and $V_N$ are as previously defined.

Since the potential of the supply $V_N$ is a negative value, the direct voltage $V_2$ will also be negative. By proper selection of values for the supply $V_N$ and for the resistors $R_1$, $R_2$, $R_4$, $R_5$, $R_6$, $R_a$, and $R_b$, rectifiers $D_1$ and $D_2$ can be made to conduct either singly, or in combination, to apply such negative voltage to the control grids of the tubes shown as will blank the reproduced video or mute the recreated audio or both, as desired.

Figure 5:
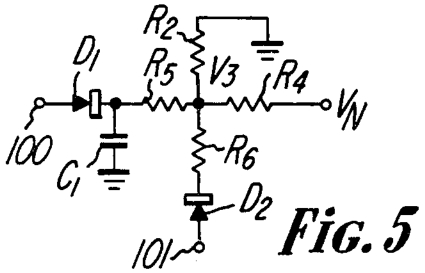

A third possible arrangement for the configuration of FIG. 2 is that shown in FIG. 5, for the case where the programming switch $S_P$ is opened and the intermediate channel switch $S_D$ is closed. This condition occurs as the tuner is rotated between adjacent channels. The direct voltage now developed at the junction of resistors $R_2$, $R_4$ can be calculated from the expression:

$$V_3 = \frac{R_2}{R_2 + R_4} V_N \quad (3)$$

Where:

$V_3$ = the direct voltage developed at the aforementioned junction; and

Where:

$R_2$, $R_4$ and $V_N$ are as previously defined.

As with the arrangement of FIG. 4, the direct voltage developed at the junction of resistors $R_2$, $R_4$, is selected to be sufficiently negative to cause either or both rectifiers $D_1$, $D_2$ to conduct and clamp the control grid electrode of the audio or video output tubes to a negative potential, as desired. In this way, the audio muting and/or video blanking functions are again performed. In one construction of the FIG. 2 embodiment of the invention, supply voltages for the sources $V_P$ and $V_N$ were selected to be +130 and −100 volts direct current, respectively. Whereas a direct voltage at the junction of resistors $R_2$, $R_4$ of +14 volts was assumed sufficient to reverse bias rectifiers $D_1$, $D_2$ for normal operation of the output stages (FIG. 3), it was assumed that direct voltage values of at least −40 volts would be sufficient to forward bias those rectifiers to cause disabling of the selected output stage (FIGS. 4,5). Thus, $V_1$ in expression (1) is +14 volts while $V_2$ and $V_3$ in expressions (2) and (3) are each at least −40 volts. Since the absolute value for $V_2$ is greater than the absolute value for $V_3$ [compare expressions (2) and (3)], the values selected for insertion in expressions (2) and (3) were −45 volts and −40 volts, respectively.

Selecting resistor $R_3$ to have a value of 18 kilohms, the three expressions (1) - (3) can be solved to find the values of the three resistors $R_1$, $R_2$, $R_4$ once the values for voltages $V_1$ - $V_3$ and the potentials $V_P$, $V_N$ are known. In particular, it can be shown from expressions (1) - (3) that resistors $R_1$, $R_2$ and $R_4$ can be determined from the following expressions:

$$R_1 = R_2 \left[ \frac{V_N - V_2(1 + A)}{V_2 - V_N} \right] \quad (4)$$

$$R_2 = R_3 \left[ \frac{V_N - V_1}{B(V_1 - V_N) + A(V_1 - V_P) + (V_1 - V_N)} \right] \quad (5)$$

$$R_4 = R_2 \left[ \frac{V_N - V_3}{V_3} \right] \quad (6)$$

Where:

$$A = \left[ \frac{V_N - V_3}{V_3} \right] \quad (7)$$

and $$B = \frac{V_N - V_2(1 + A)}{V_2 - V_N} \quad (8)$$

With these resistances expressible as above, the values of resistors $R_3$, $R_5$ and $R_6$ were selected in one specific arrangement to mute the sound and blank the video simultaneously and so that the direct voltage developed at the junction of resistors $R_2$, $R_4$ would appear as a voltage source. Such values were the previously noted 18 kilohms for the first of these three resistors, 390 kilohms for the second and 220 kilohms for the third. Additionally, the value for the component $R_a$ used for grid biasing of the audio output stage was selected equal to 470 kilohms. With these values of resistance—and with the direct voltages and potentials selected above, expressions (4) - (6) were solved and commercially available values of resistance were chosen. In this specific arrangement of the invention, the final values selected were $R_1$ = 6.8 K, $R_2$ = 68 K, and $R_4$ = 91 K. With these values of resistance, it was found that the direct voltages $V_2$ and $V_3$ could be in error by amounts up to 10 percent and still provide the desired muting and blanking. At the same time, it will be seen that no error is thus introduced into the calculation of the voltage $V_1$ since the rectifiers $D_1$ and $D_2$ are open circuited when such condition exists, so that any variations in resistors $R_5$ and $R_6$ may be disregarded. With the values of resistors noted above, the direct voltages $V_1$ - $V_3$ were calculated to be +13.9, −45.1, and −42.8 volts, respectively.

Figure 6:
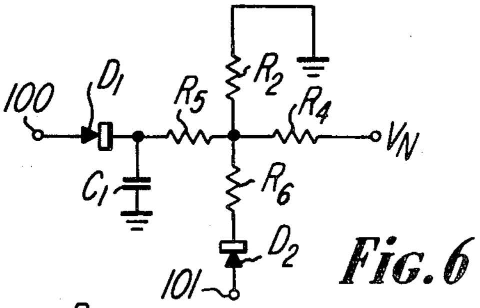

The arrangement of FIG. 6 represents the equivalent switch configuration for the case where both the programming switch $S_P$ and the intermediate channel switch $S_D$ are closed. Such instance arises during a channel change due to the tuner configuration respecting the switch contacts and rotor blade of the adjacent channel switch $S_D$—namely, that the switch $S_D$ overlaps slightly the operating range of the programming switch $S_P$. Such configuration has the effect of permitting the intermediate channel switch $S_D$ to close before the programming switch $S_P$ opens. At the same time, this construction closes the programming switch $S_P$ before the intermediate channel switch $S_D$ opens when an undesired or unprogrammed detent position has been reached.

As will be noted from the previous illustration, this configuration is identical to that which occurs where only the intermediate channel switch $S_D$ is closed, and insures a continuous transition from the instant where only the programming switch is closed (FIG. 4) to the instant where the programming switch opens and the intermediate channel selector switch closes (FIG. 5). With the arrangement of FIG. 6, it will be seen that the described circuit serves to blank the video and mute the sound when either the programming switch or adjacent channel switch is closed or when both.

As with the blanking and muting circuit described in our concurrently filed application, numerous advantages attach to the switch construction shown in FIG. 2. For example, it will be seen that the bypassing of any or all undesired channels is again at the disposal of the customer through the fine tuning arrangement controlling the channel programming. Through this control, each undesired channel can once again be video blanked and audio muted during remote tuning operation—as with the motor drive arrangements of the prior art patents noted—but also during manual channel selection as well. In addition, all undesirable audio and video information are eliminated between programmed channels, so as to maintain the elimination of on-rushing sound or flickering picture during such intervals. Also, significantly important—as in the accompanying case—is the fact that the operation of this described configuration can be precisely predicted due to its dependence primarily on D-C supply potential and resistor values which can be maintained within controlled ranges of variation. This is to be contrasted with versions of blanking and muting circuits which utilize transistor characteristics in their operation and which, consequently; depend for performance on the aging and thermal environments of the semiconductor device employed.

Figure 7:
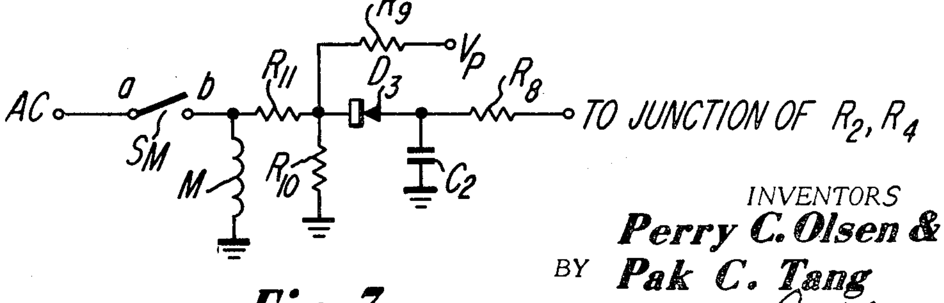
FIG. 7 shows an arrangement for operating the switch configuration of FIG. 2 by remote control.

One further feature of the disclosed invention is that it can operate either independently of, or in connection with a remote control mechanism, just as the arrangement in our concurrent case. Thus, the described circuit herein can find usefulness both in those receivers which are equipped for remote power tuning, as well as those designed solely for manual channel selection. One such remote control mechanism is illustrated in FIG. 7, and is particularly attractive in that audio muting and video blanking are provided when the motor is activated. As shown, the motor is represented by a winding M, serially coupled between one terminal *b* of the remote control switch $S_M$ and ground. One terminal of a resistor $R_{11}$ is also coupled to this contact *b*, while its other end is connected to ground through a resistor $R_{10}$, on the one hand, and to the source of positive direct potential $V_P$ by a resistor $R_9$, on the other hand. The cathode of a semiconductor rectifier $D_3$ is connected to the junction of resistors $R_9$ - $R_{11}$, while the anode of the rectifier $D_3$ is coupled to the junction of resistors $R_2$, $R_4$ of FIG. 2 via a further resistor $R_8$. A capacitor $C_2$ is included to couple the junction of rectifier $D_3$ and resistor $R_8$ to ground.

As will be seen, when the switch $S_M$ is in its open position, the circuit disclosed in FIGS. 2–6 will operate as therein described since the motor M is not energized. Rectifier $D_3$, in this instance, is reverse biased by the voltage divider comprising resistors $R_9 - R_{11}$ (neglecting the D-C resistance of the motor M), and is thus an open circuit. When the switch $S_M$ is closed, however, rectifier $D_3$ and capacitor $C_2$ function as a half-wave rectifier with respect to an alternating potential applied to contact *a* of the switch $S_M$, to produce by filtering, a negative voltage which is applied through resistor $R_8$ to the junction of resistors $R_2$, $R_4$. Resistors $R_{10}$ and $R_{11}$ of this arrangement are selected such that the negative voltage produced when the switch $S_M$ is closed is of sufficient negative value to forward bias the rectifiers $D_1$ and $D_2$ (FIG. 2) as will accomplish the audio muting and video blanking operations described. Since resistors $R_{10}$, $R_{11}$ are selected to provide the proper negative voltage, resistor $R_9$ is selected of a value to reverse bias the rectifier $D_3$ when the switch $S_M$ is opened. The value of resistor $R_8$, on the other hand, is chosen to cooperate with the resistors of the blanking and muting circuit to bias off both the audio and video stage when the motor switch $S_M$ is closed. In one construction of this remote control arrangement, resistor $R_8$ was selected to equal 180 kilohms, resistor $R_9$ to equal 68 kilohms, resistor $R_{10}$ to equal 15 kilohms, resistor $R_{11}$ to equal 18 kilohms and capacitor $C_2$ to equal 0.39 microfarads.

While there has been described what is considered to be a preferred embodiment of the present invention, it will be evident that other modifications—such as changing rectifier polarities, supply voltage polarities, and connections to appropriate electrodes of the audio and video output tubes—may be made by those skilled in the art. It is therefore contemplated that the appended claims be read in the true spirit and scope of the teachings disclosed herein. Thus, it will be seen that the described embodiment will attain the muting and blanking operations where the intermediate channel switch $S_D$ is located on a wafer disk rotatable with the tuning shaft to electrically connect a pair of included clips, for example, just as well as the illustrated arrangement where a turning of the tuner shaft causes the detent spring to touch the metal leaf connected to the junction of resistors $R_1$, $R_2$. With the present invention, similar muting and blanking will be had irrespective of the specific switch arrangements within the tuner construction, and in environments where tuning is accomplished either manually or automatically by remote control. The operation is thus substantially similar to that described in connection with the arrangement disclosed in our concurrently filed application, but in the context of a tuner having a pair of grounded switches, rather than the single grounded switch of our other case. Such added grounding, enables a modification to be had in the specific blanking and muting circuit construction, but one which retains the simplicity of construction and reliability of operation due to its dependence solely on resistor and D-C supply potential values. When employed with the remote control channel changing configuration, furthermore, both the switch arrangements of this and our other case prove additionally advantageous in affording the blanking and muting functions when tuning through a programmed channel—that is, in bypassing programmed channels between the one channel presently selected and the one to which tuning is desired.

What is claimed is:

1. A video blanking and sound muting circuit for a television receiver having a manually operated detenting channel selector and effective upon manual operation of said selector to de-activate the video and sound reproduction systems of said receiver during channel changing, comprising:

first and second potential sources;

a plurality of relatively fixed impedances serially coupled between said sources and forming at least one junction point therebetween;

first and second rectifier means respectively coupling said junction point to control terminals of each of said video and sound reproduction systems to regulate the operations thereof during said channel changing;

a first switch means coupled to the junction between a first and second of said plurality of impedances and operative in conjunction with said detenting channel selector to bypass said first impedance and modify the serial coupling between said first and second potential sources when said selector is manually changed to an undesired channel to establish a first direct voltage condition at said junction point; and a second switch means coupled to the junction between said second and a third of said plurality of impedances and operative in conjunction with said detenting channel selector to bypass said first and second impedances and additionally modify the serial coupling between said first and second potential sources when said selector is manually changed between adjacent channels to establish a second, different direct voltage condition at said junction point;

said first and second potential sources and said first, second and third fixed impedances being selected such that either of said first and second direct voltage conditions is sufficient to bias at least one of said rectifier means in a direction to de-activate its associated video or sound reproduction system and such that a third direct voltage condition is developed at said junction point in the absence of said selector being manually changed to an undesired channel or between adjacent channels which is sufficient to bias both of said rectifier means in a direction to activate both their associated video and sound reproduction systems during this normal operative mode of said television receiver.

2. The circuit of claim 1 for use in a television receiver also having an electric motor adapted to drive the channel selector under a remote control order, wherein said circuit additionally includes:

third rectifier means coupled to said junction point formed on said plurality of fixed impedances; and means, including a third switch means coupled to said third rectifier means, for biasing said third rectifier means in response to the energization of said motor by the giving of said remote control order in a direction to establish a direct voltage condition at said junction point sufficient to bias at least one of said first and second rectifier means in a direction to deactivate its associated video or sound reproduction system when said order is given and for biasing said third rectifier means in response to the de-energization of said motor by the absence of said remote control order in a direction to establish another direct voltage condition at said junction point sufficient to bias both of said first and second rectifier means in a direction to activate their associated video and sound reproduction systems when said order is absent during the normal operative mode of said television receiver;

whereby at least one of the video and sound reproduction systems of said receiver is further de-activated during remote control channel changing.

3. The circuit of claim 1 wherein said first and second direct voltage conditions developed at said junction point of impedances forward bias at least one of said rectifier means in a direction to de-activate its associated video or sound reproduction system and wherein said third direct voltage condition developed at said junction point reverse biases both of said rectifier means in a direction to activate their associated video and sound systems.

4. A video blanking and sound muting circuit for a television receiver having a manually operated detenting channel selector and effective upon manual operation of said selector to de-activate the video and sound reproduction systems of said receiver during channel changing, comprising;

first and second potential sources of opposite polarity;

first, second, third and fourth resistors serially coupled between said sources;

a first rectifier coupling the junction between said third and fourth resistors to a control terminal of said sound reproduction system to regulate its operation during said channel changing;

a second rectifier coupling said junction between said third and fourth resistors to a control terminal of said video reproduction system to additionally regulate its operation during said channel changing;

a first switch means having one contact coupled to the junction between said first and second resistors and another contact coupled to a point of reference potential, with said first switch means being operative in conjunction with said detenting channel selector to connect said contacts when said selector is manually changed to an undesired channel; and a second switch means having one contact coupled to the junction between said second and third resistors and another contact coupled to said point of reference potential, with said second switch means being operative in conjunction with said detenting channel selector to connect said contacts when said selector is manually changed between adjacent channels;

said first and second potential sources and said first, second, third and fourth resistors being selected such that direct voltage conditions are developed at the junction of said third and fourth resistors when said channel selector is manually changed to an undesired channel and between adjacent channels of a magnitude sufficient to bias at least one of said first and second rectifiers in a direction to de-activate its associated video and sound reproduction systems and such that a third direct voltage condition is developed at the junction of said third and fourth resistors in the absence of said selector being manually changed to an undesired channel or between adjacent channels of a magnitude sufficient to bias both of said first and second rectifiers in a direction to activate their associated video and sound reproduction systems during this normal operative mode of said television receiver.

5. The circuit of claim 4 wherein a fifth resistor is included to couple said junction between said third and fourth resistors to the cathode of said first rectifier, the anode of which is coupled to said sound reproduction system control terminal, wherein a sixth resistor is included to couple said junction between said third and fourth resistors to the cathode of said second rectifier, the anode of which is coupled to said video reproduction system control terminal, and wherein a first capacitor is included to couple the cathode of said first rectifier to said point of reference potential.

6. The circuit of claim 5 for use in a television receiver also having an electric motor adapted to drive the channel selector under a remote control order, wherein said circuit additionally includes:

seventh and eighth resistors serially coupled between said first potential source and said point of reference potential;

a third rectifier;

a third switch means;

ninth and tenth resistors respectively coupling said third rectifier to said third switch means and to said junction between said third and fourth resistors;

a second capacitor coupling the junction of said third rectifier and said tenth resistor to said point of reference potential;

such that energization of said motor to effect channel changing in response to the giving of said remote control order establishes a direct potential at the junction of said third rectifier and said second capacitor sufficient to bias at least one of said first and second rectifiers in a direction to de-activate its associated video or sound reproduction system when said order is given and such that said third rectifier is biased by said seventh and eighth resistors in the absence of said remote control order being given to establish another direct potential at the junction of said third and fourth resistors which is sufficient to bias both of said first and second rectifiers in a direction to activate both their associated video and sound reproduction systems during the normal operative mode of said television receiver;

whereby at least one of the video and sound reproduction systems of said receiver is further de-activated during remote control channel changing.

7. The circuit of claim 6 wherein said eighth and ninth resistors are selected to provide said first direct potential at the junction of said third rectifier and said second capacitor of a value sufficient to bias at least one of said first and second rectifiers in a direction to de-activate its associated video and sound reproduction system when said remote control order is given.

8. The circuit of claim 7 wherein said seventh resistor is selected of a value to cooperate with said first potential source and said eighth resistor to bias said third rectifier in the absence of said remote control order being given such that both of said first and second rectifiers become biased in directions to activate both their associated video and sound reproduction systems in the absence of said order.

9. The circuit of claim 8 wherein said tenth resistor is selected of a value such that the potential developed across said second capacitor and coupled to the junction of said third and fourth resistors will, in conjunction with said first, second, third, fourth, fifth and sixth resistors and said first and second potential sources, bias both of said first and second rectifiers in a direction to de-activate their associated video and sound reproduction systems when said remote control order is given.

* * * * *